Nov. 3, 1970 R. L. DE MONTEBELLO 3,538,198
PRODUCTION OF LENTICULAR SHEETS FOR INTEGRAL PHOTOGRAPHY
Filed Dec. 4, 1967 7 Sheets-Sheet 7

INVENTOR.
ROGER LANNES deMONTEBELLO
BY
MORGAN, FINNEGAN, DURHAM & PINE
ATTORNEYS

United States Patent Office 3,538,198
Patented Nov. 3, 1970

3,538,198
PRODUCTION OF LENTICULAR SHEETS FOR
INTEGRAL PHOTOGRAPHY
Roger Lannes de Montebello, 165 E. 66th St.,
New York, N.Y. 10021
Filed Dec. 4, 1967, Ser. No. 687,527
Int. Cl. B29d 11/00; G02b 27/00; B29c 1/02
U.S. Cl. 264—1
3 Claims

ABSTRACT OF THE DISCLOSURE

Apparatus and method are provided for accurately and efficiently producing lenticular sheets from transparent plastic resins for use in the practice of integral photography. A special molding procedure is provided for forming an orginial mold, and for using the mold to form lenticular sheets, preferably reinforced, for taking integral photographs, for converting pseudoscopic photographs into stereoscopic integral photographs, and for viewing integral photographs under special conditions.

BACKGROUND OF THE INVENTION

Field of the invention and prior art

The present invention is related to the taking, conversion, production and viewing of integral photographs.

Integral photography has been known at least since 1908, by the publication of Lippmann, Académie des Sciences, Comptes Rendus 146, 1908, pp. 448–451.

However, no efficient, accurate means have been provided in the prior art for the making of the required lenticular sheets having a multiplicity of regularly arranged lenslets of the same focal length and aperture, and so accurate as to be registrable with perforated sheets and other lenticular sheets, owing in part to the avoidance of dimensional changes, a difficulty which is overcome by the present invention.

SUMMARY OF THE INVENTION

In general, the apparatus of the invention provides a means for making a mold for a lenticular sheet in which a press having parallel platens, movable toward and from each other, is provided. On the flat face of the lower platen, there is placed a thick flat plano-parallel slab. A perforated metal sheet is held in position by register pins and lightly cemented to the slab by a pressure sensitive adhesive. The apertures in the perforated sheet are of uniform size and regularly spaced in a square or hexagonal pattern.

Overlying each of the apertures in the perforated metal sheet is one of a multiplicity of balls, all of which preferably have been carefully graded so that they are of uniform size; the better the grading, the better the quality of the integral photograph.

The balls have a diameter which is substantially greater than the diameter of the apertures in which each is seated, while the spacing of the apertures is substantially greater than the diameter of the balls. Thus, in a practical form of the invention, the thickness of the perforated metal sheet may be about 0.008 inch, or more than is necessary to keep the overlying ball from initially extending through the metal sheet and resting on the metal slab which would destroy the locating function of the aperture. The apertures have a preferable diameter of about 0.040 inch and are spaced on a pitch of about 0.093 inch, while the balls have a uniform diameter of about 0.062 inch.

These dimensions may vary widely so long as the diameter of the balls is uniform and exceeds the diameter of the apertures in which they are seated, and also that the diameter of the balls is less than the pitch or separation of the apertures from each other. For certain purposes, e.g. for the production of integral photographs for roadside signs, it may be desirable to have the balls as large as one inch, or even more.

Overlying the array of balls is laid a sheet of a heat-deformable plastic resin, preferably a fluorocarbon, especially fluorochlorocarbon resin, such as an Aclar® resin (trichlorotrifluoroethylene), which may be molded under heat and pressure. The Aclar® resin has the unusual property of easily releasing almost all materials which are later cast against its face. This resin sheet is preferably cemented to a heavy slab having parallel flat faces and register holes to correspond to the register pins of the lower slab. The fluorochlorocarbon resins are preferred over the Teflon® resins due to the lower temperature required for molding.

Bearers or limiting blocks are provided to control the extent to which the plastic resin sheet is deformed by the balls under heat and pressure.

As the balls are forced into the plastic resin layer, the balls are held accurately in their relative spacing by the apertures in the underlying metal sheet in which they are seated and as they displace the plastic of the overlying sheet, partispherical cavities are formed.

After molding under heat and pressure, the plastic resin layer is cooled, and is then removed from the press, whereupon it is then available for use as a mold for the molding of a lenticular sheet from a clear, transparent, curable liquid resin, such as a polyester resin, preferably having a refractive index of at least 1.56, such as Laminac® No. 4116.

Once the mold member has been formed, it and its supporting slab are transferred to another molding cavity and positioned, plastic side up, on one of the flat faces of the mold. The other face of the mold preferably comprises a heavy, thick sheet of polished glass having a flat surface adjacent the mold member. Between the glass surface and the face of the mold member, there is preferably positioned a reinforcing, apertured metal sheet having uniform apertures coaxial with the spherical concavities of the mold member, which metal sheet is supported over the mold member and below the upper glass sheet so that it may be embedded in the liquid plastic resin filling the mold.

Register means are provided for accurately registering the apertured reinforcing member with respect to the lenslets of the lenticular sheet. Each of the metal sheets used in the practice of the present invention has its apertures located in the same arrangement and on the same spacing or pitch, and these apertures bear the same relationship to widely spaced register holes in the margins of the metal sheets so that the apertures in any one metal sheet may be accurately registered with the apertures of another sheet of the same series, and may also be accurately registered with a lenticular sheet derived from any one of the metal sheets, through the use of register pins which serve, with the register holes, to accurately locate the sheets.

BRIEF DESCRIPTION OF THE DRAWINGS

FIG. 7-A is another fragmentary sectional view of a portion of the parts shown in FIG. 7 but on an even larger scale to show details which are not shown in FIGS. 6 and 7;

DETAILED DESCRIPTION OF THE PREFERRED EMBODIMENT

Figure 1:
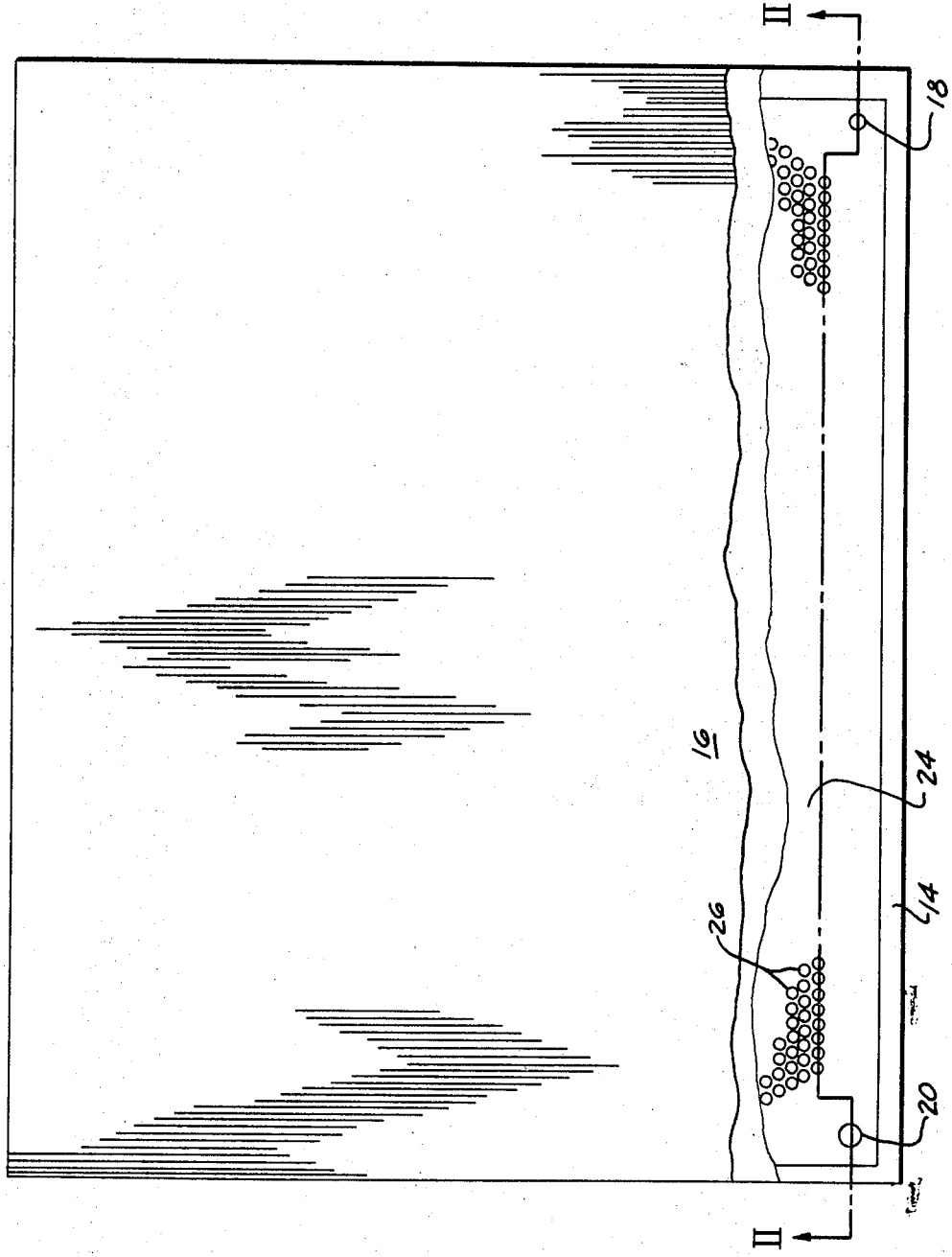
FIG. 1 is a top plan view with parts broken away of the assembly to produce a molding member.

Referring now in detail to the preferred and illustrative embodiment and method of the present invention:

Means are provided for making a mold for the casting of a lenticular sheet for viewing integral photographs, having over its entire surface a closely packed series of identical lenslets of parti-spherical form. There is provided a conventional hydraulic press having upper and lower platens 10 and 12 with flat parallel faces. On the lower platen 10 is positioned a sufficiently large thick metal slab 14 having its two faces flat and parallel to each other, and overlying this plate is another thick metal plate 16, also having flat parallel faces, the upper one of which is to be engaged by the upper platen 12 of the press. The plate 14 and 16 are held in register with each other and against lateral shifting during their utilization by means of register pins 18 and 20 which extend through closely fitting apertures in the plates 14 and 16, and allow vertical motion of the plates toward and from each other.

Figure 3:
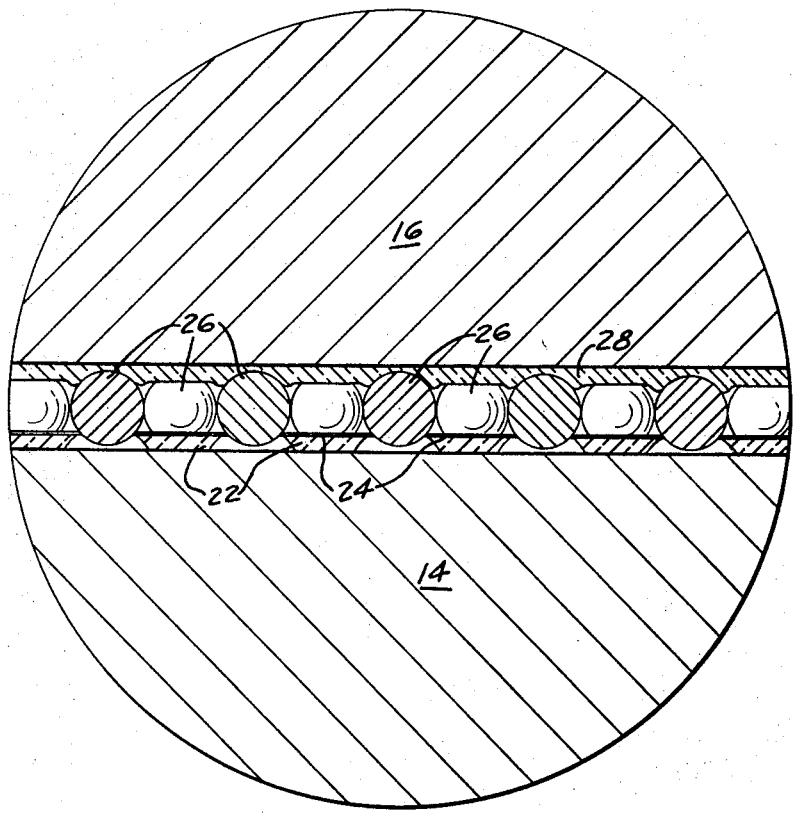
FIG. 3 is a fragmentary detailed sectional view of a portion of FIG. 2.
Figure 4:
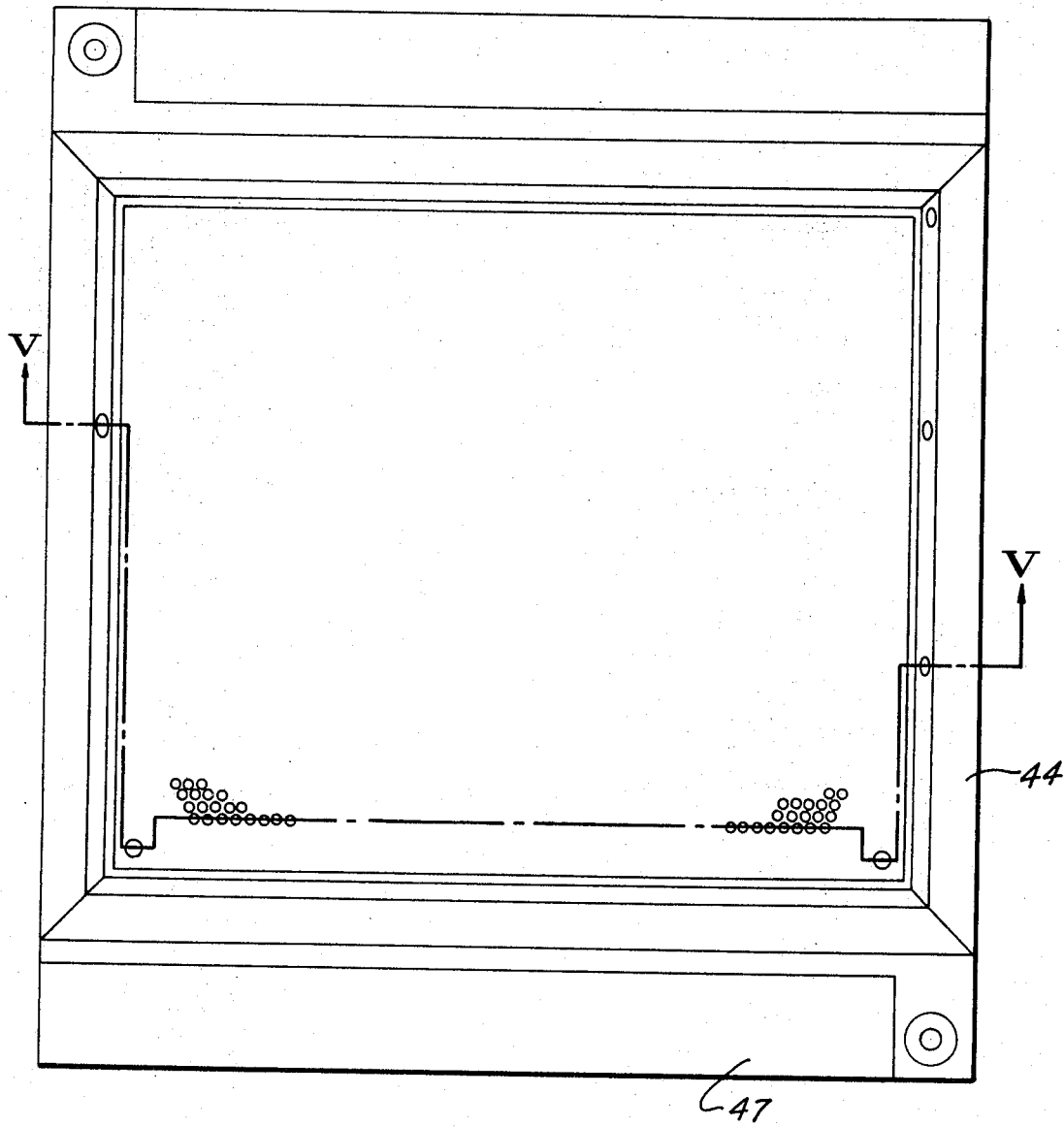
FIG. 4 is a top plan view of casting assembly to produce a lenticular sheet according to the present invention.
Figure 5:
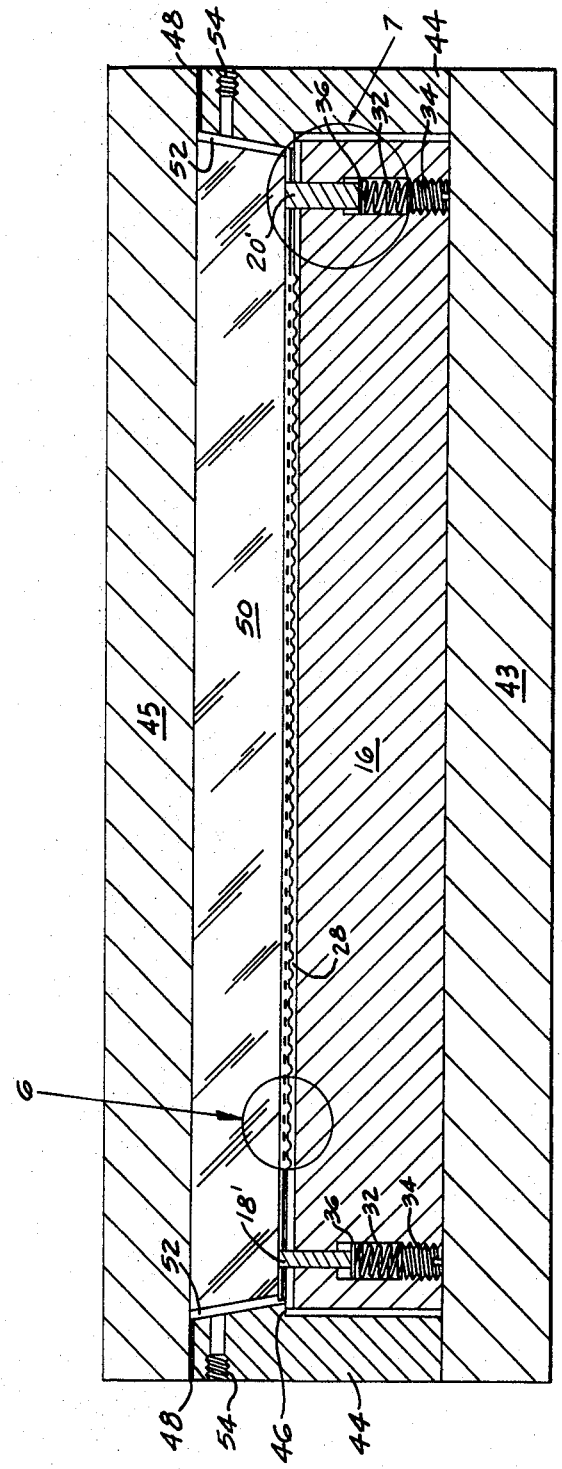
FIG. 5 is a sectional view taken on the line 5—5 of FIG. 4.
Figure 6:
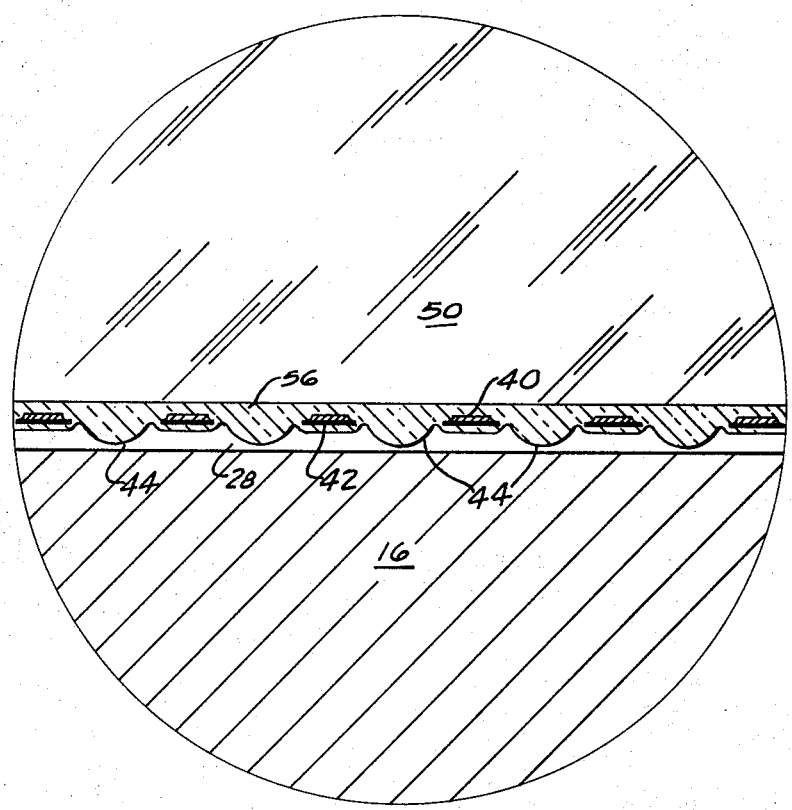
FIG. 6 is a fragmentary detailed sectional view of an encircled portion of FIG. 5.
Figure 7A:
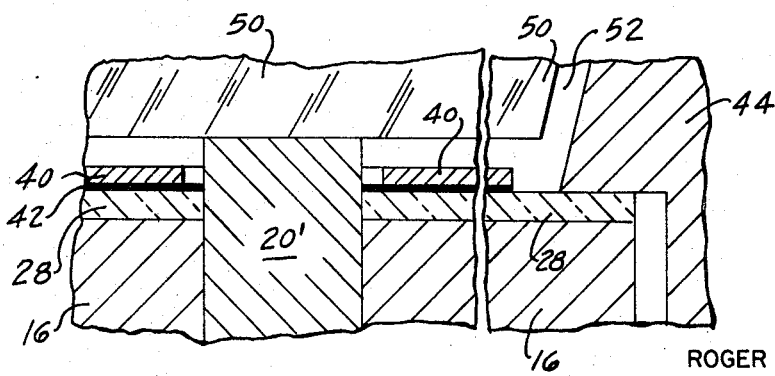
FIG. 7 is another fragmentary detailed sectional view of an encircled portion of FIG. 5.
Figure 7:
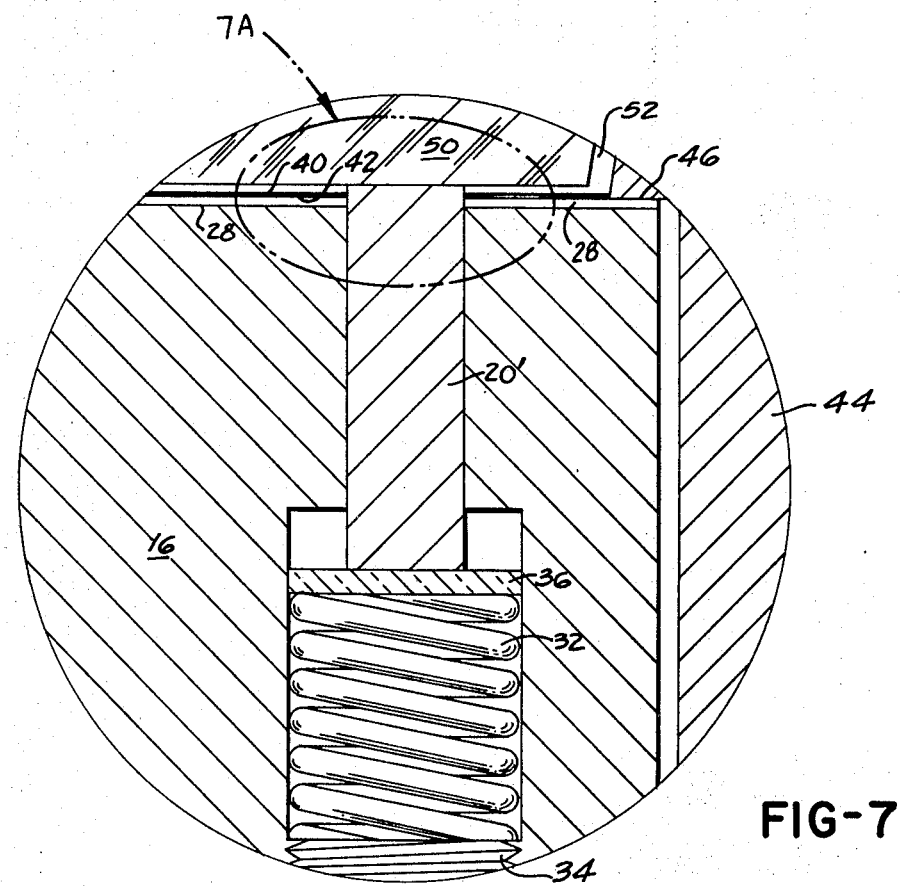

On the upper face of the lower plate 14 is cemented an apertured metal sheet, shown in detail in FIG. 3, which comprises a sheet of copper 22 carrying an electrodeposited thin layer of nickel 24. Illustratively, the copper may be about 0.007 inch thick and the nickel layer may be about 0.001 inch thick. This sheet is apertured over its entire surface, except for its marginal portions, with apertures of uniform size, spaced uniformly in a hexagonal array. The apertures in the nickel layer 24 are of uniform size, while those in the copper layer 22 are larger and need not be identical in size. Adjacent at least two of the corners of the sheet 22, 24 it is provided with holes located to coincide with the register pins 18 and 20 so that the location of the sheet is accurately controlled by the register pins.

In each of the apertures in sheet 22, 24 is positioned a spherical ball 26, and accurately graded bearing balls are preferably employed. Where the balls have a uniform diameter of about 0.062", the diameter of the apertures may be about 0.040", the balls are spaced on a pitch of about 0.093" and the thickness of the sheet 22, 24 is about 0.008". However, these dimensions may be reduced or greatly increased and pitch is always somewhat greater than the diameter of the balls 26, while the thickness of the sheet 22, 24 is such that none of the balls initially protrudes through the metal sheet 22, 24 to allow the ball to rest on the metal plate or slab 14, although it may do so during the pressing operation as pressure is applied by the platens 10 and 12.

When all of the apertures have been filled with balls 26, a plano-parallel sheet of a heat-deformable plastic resin 28 is positioned over the array of balls. This sheet of resin may be of about 0.020" thickness for use with balls having a diameter of 0.062", but may be thicker if desired. While many different heat-deformable plastic resins may be used, they should be capable of forming highly polished cavities, corresponding to the surfaces of the balls 26, and should be easily released from the resin which is to be subsequently cast in these cavities, and are preferably a fluorocarbon resin. While polytetrafluoroethylene (Teflon®) resin may be used, it is preferred to use fluorohalocarbon resin such as Aclar® resin due to the fact that it is more easily molded.

Figure 2:
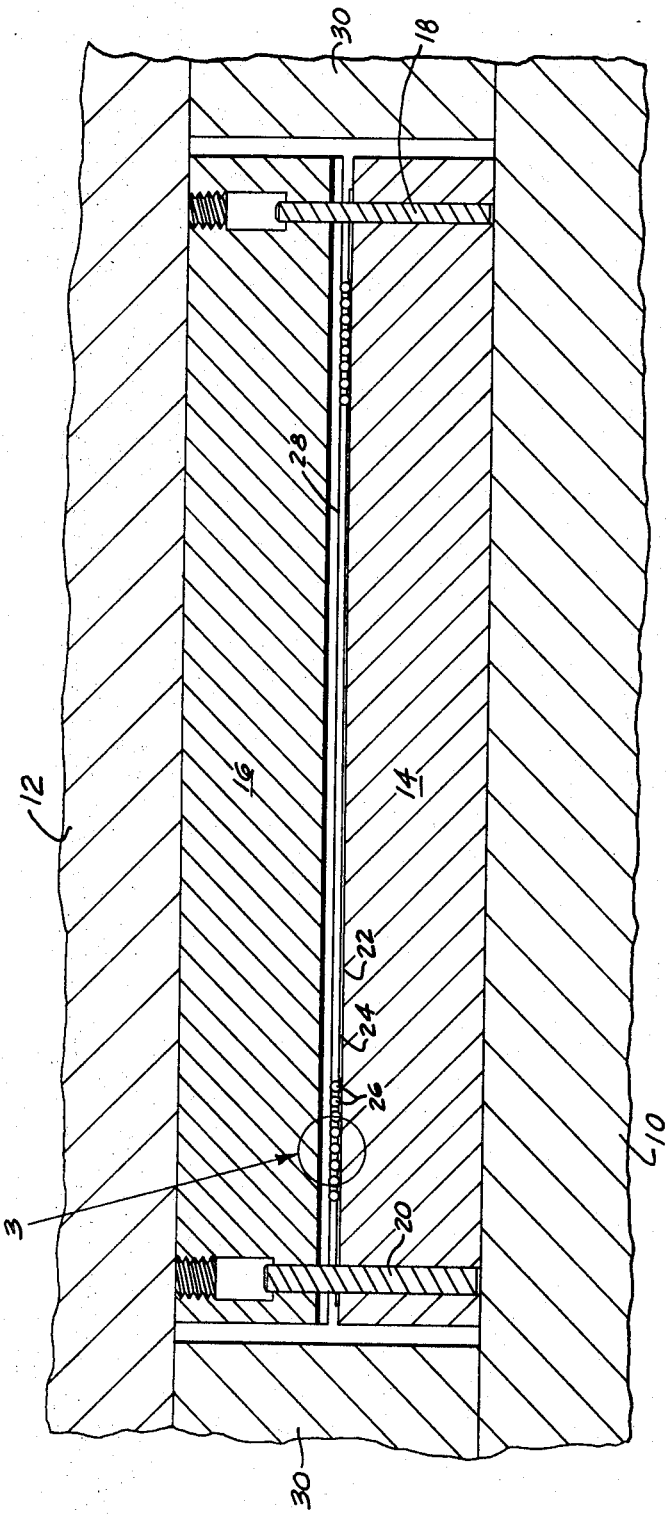
FIG. 2 is a sectional view taken on the line 2—2 of FIG. 1.

With the parts assembled as described, they are positioned between the platens 10 and 12 of the hydraulic press, with bearer blocks 30 of suitable height on at least two opposite edges of the plates or slabs 14 and 16. The height of the bearer blocks 30 is chosen so that the desired degree of penetration of the balls 26 into the plastic resin sheet 28 is obtained, usually substantially as shown in FIG. 3. FIG. 2 shows the parts as they are assembled and positioned in the hydraulic press.

The platens 10 and 12 are adapted to be heated and cooled in any conventional manner, and they are first heated while pressure is applied to the plastic sheet 28. After a proper time under heat and pressure to allow the sheet 28 to be deformed by the balls 26, the platens are cooled, and when the sheet 28 has cooled sufficiently, platen 12 is raised, plate 16 is removed, and the molded sheet 28 is separated from the attached balls of the ball array, and now constitutes the mold member into which a liquid plastic resin is to be cast to form the lenticular sheet.

Slab or plate 16 is now inverted, pins 18 and 20 are replaced with shorter register pins 18' and 20' which extend only a short distance above the surface of sheet 28 on slab 16 and are resiliently urged upwardly by means of springs 32 held in their sockets by set screws 34, a washer 36 being postioned between each spring 32 and the adjacent end of the register pin 18' or 20' so as limit the upward travel of each spring 32.

It will be noted that the two register pins 18' and 20', as well as 18 and 20, are of different diameters so that the mold sheet 28 and subsequent sheets cannot be inadvertently positioned with a wrong side up.

Over the plastic mold sheet 28 is now positioned another bimetallic, apertured sheet 40, the apertures of which are on the same pitch and in the same arrangement as those of ball locating apertured sheet 22, 24 and identically registered by the pins 18' and 20' with the registering apertures of sheet 22, 24. As with sheet 22, 24, sheet 40 is formed with a relatively thick copper sheet with its larger apertures in the copper layer, and with smaller apertures in the thinner nickel layer 42, the apertures in layer 42 being of the same size throughout the area of the sheet 40. The apertures in the nickel layer 42 are coaxial with the parti-spherical cavities 44 in the mold sheet 28. This sheet 40 serves primarily as a reinforcing sheet for the plastic resin member to be formed and in which it will be embedded, and also serves to prevent any significant dimensional change in the plastic sheet in which it will be embedded, thereby preserving the coaxial relation as well as the accurate relation of the individual lenslets to the register points.

The slab 16 with its mold member 28, molded surface uppermost, and superimposed apertured metal sheet 40, are now placed on clamping member 43, and are surrounded by a molding frame 44, having a rectangular opening which is slightly larger than the slab 16. Frame 44 is preferably provided on its inner edges with a shoulder 46 of sufficient height to snugly engage the mold sheet 28 supported on the slab 16. A resilient sealing gasket strip 48 is preferably provided on the upper face of the frame 44 so as to seal the mold cavity, and the thickness of this strip, as it may be compressed, is taken into account in determining the depth of the mold cavity as it is to be clamped between members 43 and 45.

The mold cavity is now completed by superimposing over the mold 28 and reinforcing sheet 40, 42 a thick slab 50 cemented to the under side of the clamping member 45 and having parallel flat faces with bevelled edges which, with the correspondingly bevelled upper portions of the frame 44 provides passageways 52 to the molding area. The thickness of the slab 50, which is conveniently formed of polished glass, is such that when clamping members 43 and 45 are compressed together by strong clamps, not shown, against the resilient gasket strip 48 it will provide a mold cavity of the desired thin depth overlying the mold 28. The top end faces of pins 18' and 20', due to the action of springs 32, rest snugly against the bottom face of the glass slab 50, thus providing for holes in the subsequently cast plastic sheet. The desired thickness of the plastic sheet to be cast is adjusted by means of bearers 47, in conjunction with shims (not shown) placed over the bearers 47, in appropriate number and/or thicknesses.

At opposite sides of the frame 44, there are provided threaded openings 54 communicating with the passageways 52 so that liquid resin may be introduced through one of the openings 54 while air is allowed to escape through opposite openings. Then the assembly is slightly tilted and a self-curing transparent resin is introduced into the mold cavity through the lower one of the openings 54 while air is allowed to escape through one or more opposite openings 54 which are higher, due to the tilt. As soon as the resin flows out substantially without air bubbles the openings 54 are closed.

The preferred self-curing clear, transparent resin is a polyester resin preferably having a refractive index of at least 1.56, such as Laminac® No. 4116, or that resin mixed with polystyrene, although many other clear transparent resins may be used.

When cured, having formed the reinforced lenticular sheet 56, the clamping member 45 with its cemented glass slab 50 is lifted, and an additional shim is added over bearers 47. Thereafter, the mold assembly is again clamped closed and once again the liquid resin is injected into the mold cavity, cured and released. The reason for preferring a plurality of resin injections is that, in this way, the distance of the reinforcing layer 40, 42 from the lenses 44 may be more accurately controlled. If the new layer of resin is very thin, it is poured (rather than injected) while the mold is open, and then member 45 with its glass slab 50 are replaced, taking care to avoid the entrapment of air.

Shrink marks usually occur on the upper surface of the lenslet sheet 56 which is being formed; one or more additional very thin layers of liquid resin (of the order of 0.001") are then applied to the upper surface of the lenslet sheet by repeating the procedure just described of pouring the liquid resin and allowing the resin to cure under pressure, the height of the bearers 47 being suitably adjusted by thin shims. The new thin layer or layers fill and minimize the shrink marks.

When cured, the glass slab 50 is removed, and a metal apertured diaphragm sheet 60, 62 is superimposed on the reinforced lenticular sheet 56. The apertures of the diaphragm sheet 60, 62 are of identical pitch and arrangement with those of the sheet 40, and are likewise formed of a thin layer of nickel 62 and a thicker layer of adherent copper 60. In the sheet 60, 62 the pitch and arrangement of the apertures is identical to that of sheet 40, 42, so that the apertures are coaxial with each other and with the lenslets. heet 60, 62 at its margins, is provided with register apertures to be controlled by the register pins 18' and 20' so as to establish and maintain the desired accurate coaxial relation between the several apertures and the lenslets. The pouring operation is repeated and so are those of successive pourings to eliminate shrink marks. In some cases however, the diaphragm sheet is not attached to the lenticular sheet but only juxtaposed in a camera or printed provided with identical register pins.

Figure 8:
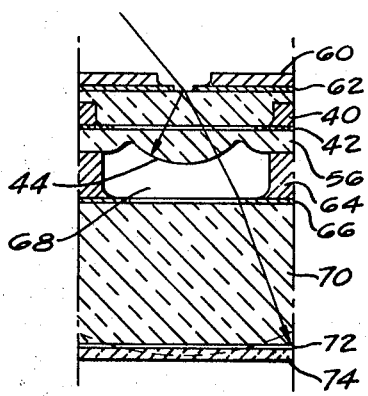
FIG. 8 is a fragmentary detailed sectional view of a lenticular sheet produced according to the present invention.

It is usually desirable to provide an apertured field-limiting sheet underlying the lenticular sheet, with apertures of the same arrangement and pitch as the lenslets and in complete register with the lenslets. The field limiting sheet is also formed from a copper support sheet 64 and an adherant apertured nickel layer 66, having the proper register holes in its marginal portions. The field limiting sheet is preferably cemented to the lower face of the lenticular sheet 56, as shown in FIG. 8, with its apertures in accurate coaxial register with the lenslets. This field limiting aperture sheet has apertures which accurately define the viewing angle of the photographic image to be recorded or observed. The field limiting sheet provides an air space 68 between the lenses of the lenticular sheet 56 and a spacing sheet 70 of clear transparent plastic on the other face of which is mounted the photographic film, as shown in FIG. 8. The aerial images are limited by the sheet 64, 66 and are formed on the photographic layer 72 supported on its film base 74 and are in coaxial register with the diaphragm apertures in layer 64 and with the lenslets of sheet 56. Layer 70 is of the proper thickness to obtain proper focus.

Conveniently, the images on the photographic layer 72 supported on its base 74 are produced in accordance with the process of my prior copending U.S.A. application Ser. No. 600,957, filed Dec. 12, 1966 using lenslets of the proper focal length, arrangement and pitch spacing.

By suitably adjusting the thickness of the layer 70 so that the photographic layer 72 is in proper focus for the taking of a picture, the assembly may be used for the initial exposure of the photographic layer to the image to be recorded as an integral photograph. After exposure, development and usual processing, the film 72, 74 may be placed in a similar assembly of lenticular sheet and perforated sheets for conversion from negative or positive pseudoscopic to positive stereoscopic integral photographs as disclosed in copending application Ser. No. 600,957, filed Dec. 12, 1966. The resulting positive may be observed as there disclosed, and the above casting procedure may also be used to produce other types of lenticular sheets, such as those of FIGS. 5, 6, 14, 15 and 16 of said application Ser. No. 600,957.

The invention in its broader aspects is not limited to the specific mechanisms, steps, processes and compositions shown and described but departures may be made therefrom within the scope of the accompanying claims without departing from the principles of the invention and without sacrificing its chief advantages.

What is claimed is:

1. A method of making a mold for a lenticular sheet having a multiplicity of identical lenslets, which comprises providing a thick metal plate, cementing thereto a thin flat sheet perforated with holes of uniform size in a regular pattern, positioning balls of uniform diameter, larger than the diameter of the holes and smaller than the spacing of the holes, one ball overlying each of the holes in a single layer, placing a sheet of heat-deformable plastic fluorocarbon resin over the array of balls, subjecting the plastic sheet to heat and pressure while controlling the depth of penetration of the balls into the plastic sheet whereby a mold with concavities is formed, and removing the plastic sheet from the array of balls.

2. A method according to claim 1 in which the plastic sheet is a fluorochlorocarbon.

3. A method of making a reinforced lenticular sheet which comprises making a mold for a lenticular sheet having a multiplicity of identical lenslets, which comprises providing a thick metal plate, cementing thereto a thin flat sheet perforated with holes of uniform size in a regular pattern, positioning balls of uniform diameter, larger than the diameter of the holes and smaller than the spacing of the holes, one ball overlying each of the holes in a single layer, placing a sheet of heat-deformable plastic fluorocarbon resin over the array of balls, subjecting the plastic sheet to heat and pressure while controlling the depth of penetration of the balls into the plastic sheet whereby a mold with concavities is formed, and removing the plastic sheet from the array of balls, positioning the plastic sheet on one face of a mold chamber, with a metal, apertured reinforcing sheet between said molded plastic sheet and a spaced parallel face of the mold chamber, the apertures of the metal sheet being in coaxial register with the concavities of the molded plastic sheet to form diaphragms for each of the lenslets, filling the mold chamber with a clear, transparent liquid plastic resin, and hardening the plastic resin to form a lenticular sheet having the reinforcing apertured diaphragm member embedded therein.

References Cited

UNITED STATES PATENTS

| | | | |
|---|---|---|---|
| 1,206,287 | 11/1916 | Auerbacher | 264—1 |
| 1,849,036 | 3/1932 | Ernst | 350—167 |
| 2,387,038 | 10/1945 | Owens | 350—105 |
| 2,854,337 | 9/1958 | Pearson | 350—167 |
| 3,365,524 | 1/1968 | Thompson et al. | 264—1 |

FOREIGN PATENTS

| | | |
|---|---|---|
| 238,122 | 5/1960 | Australia. |
| 484,620 | 7/1952 | Canada. |
| 991,851 | 5/1965 | Great Britain. |

JULIUS FROME, Primary Examiner

A. H. KOECKERT, Assistant Examiner

U.S. Cl. X.R.

264—220, 273, 316; 350—167